United States Patent [19]

Stufflebeam et al.

[11] Patent Number: 5,228,522

[45] Date of Patent: Jul. 20, 1993

[54] LIFT ASSIST AND CUSHION SPRING TOOL BAR WHEEL FOR AGRICULTURAL IMPLEMENTS

[75] Inventors: John F. Stufflebeam, Romeoville; Roland J. Frase, Roselle, both of Ill.

[73] Assignee: Case Corporation, Racine, Wis.

[21] Appl. No.: 724,043

[22] Filed: Jul. 1, 1991

[51] Int. Cl.$^5$ .................. A01B 61/04; A01B 63/11
[52] U.S. Cl. .................. 172/413; 172/417; 172/448; 172/671; 280/43.18; 280/43.23
[58] Field of Search ............ 172/240, 265, 310, 407, 172/413, 414, 417, 448, 500, 501, 624.5, 671, 669, 710; 280/43.18, 43.23, 701

[56] References Cited

U.S. PATENT DOCUMENTS

| | | | |
|---|---|---|---|
| 2,732,781 | 1/1956 | Coviello | 172/413 X |
| 2,788,908 | 4/1957 | Lynd | 280/43.23 X |
| 2,981,344 | 4/1961 | Roberson | 172/417 X |
| 3,343,848 | 9/1967 | Dorschner | 172/413 X |
| 3,543,864 | 12/1970 | Wenzel | 280/43.23 X |
| 3,583,495 | 6/1971 | Cantral et al. | 172/316 |
| 3,672,701 | 6/1972 | Blank | 280/43.23 X |
| 3,731,749 | 5/1973 | Sullivan et al. | 280/43.23 X |
| 3,809,165 | 5/1974 | Miller | 172/413 X |
| 3,870,107 | 3/1975 | Orthman | 172/413 |
| 3,878,901 | 4/1975 | Robertson, Sr. | 172/413 |
| 4,178,005 | 12/1979 | Kent, Jr. | 280/43.18 |
| 4,724,910 | 2/1988 | Wheeler | 172/500 X |
| 4,817,730 | 4/1989 | Winter | 172/448 X |
| 4,903,781 | 2/1990 | Smit | 172/316 |

Primary Examiner—Dennis L. Taylor
Assistant Examiner—Jeffrey L. Thompson
Attorney, Agent, or Firm—Dressler, Goldsmith, Shore, Sutker & Milnamow, Ltd.

[57] ABSTRACT

A agricultural implement incorporates a frame which is adapted to engage a three point hitch of a tractor. The frame employs a longitudinally extending member which is pivotally connected to a link member. A resilient yielding assembly is disposed between the longitudinally extending member and the link member to absorb forces exerted from the link member onto the longitudinally extended member. Accordingly, when the link is acted upon by forces which cause the link to exert a stress on the three point hitch of a tractor, the resilient yielding assembly allows the first link to pivot about the longitudinal member thereby reducing compressive loads exerted on the upper link of the tractor's three point hitch.

9 Claims, 3 Drawing Sheets

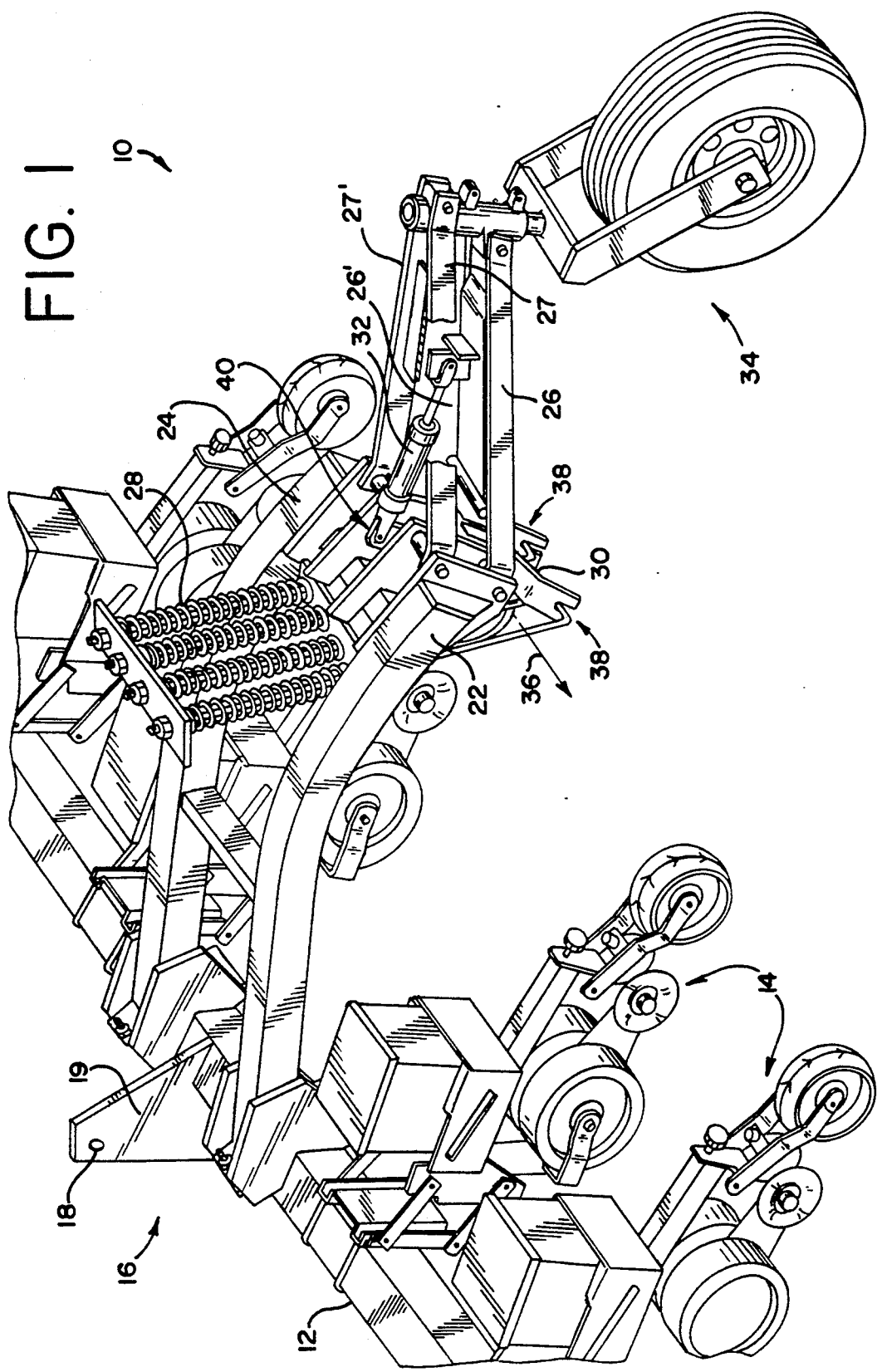

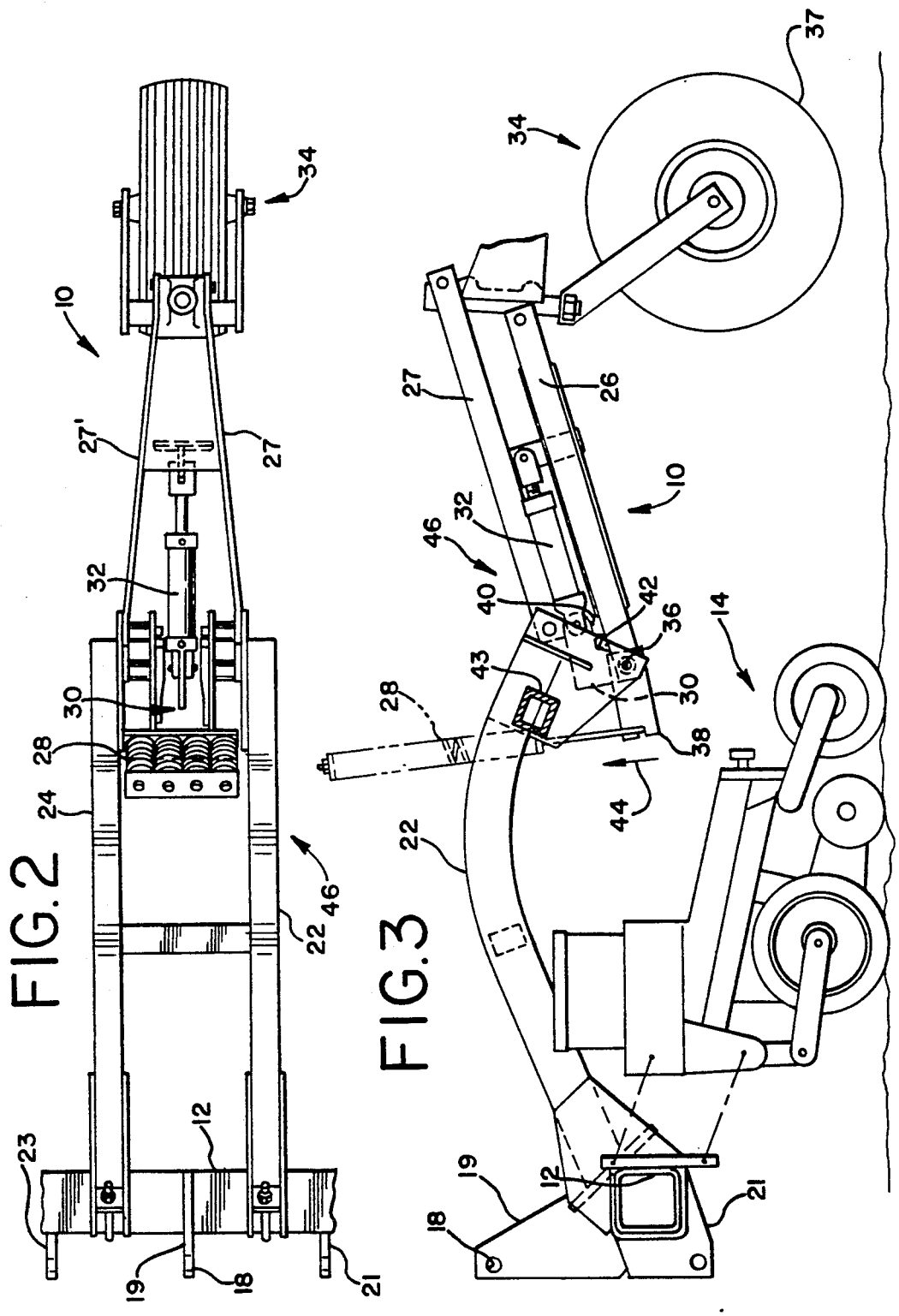

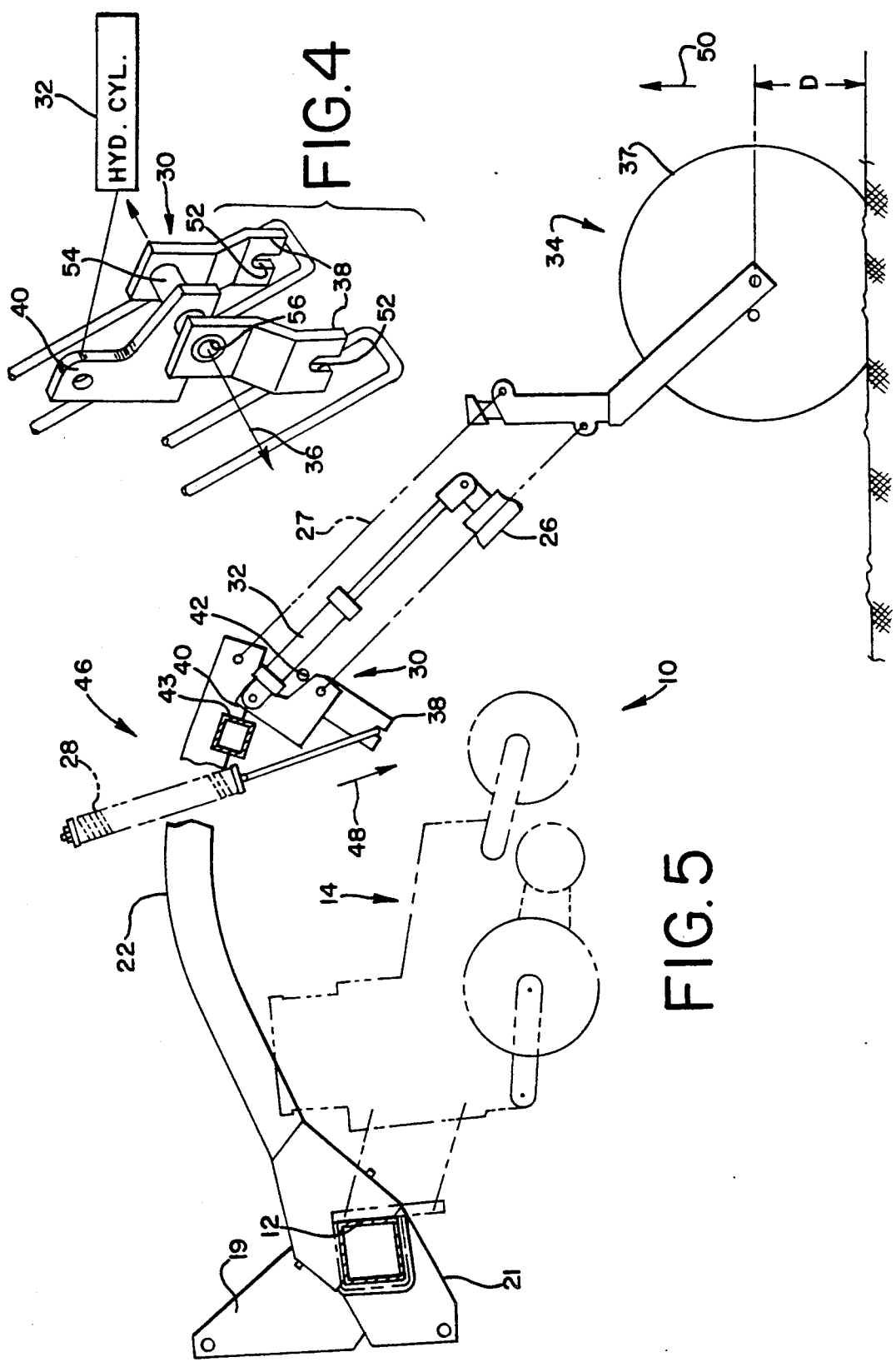

LIFT ASSIST AND CUSHION SPRING TOOL BAR WHEEL FOR AGRICULTURAL IMPLEMENTS

BACKGROUND OF THE INVENTION

This invention relates generally to systems for connecting implements to tractors and deals more particularly with a system which allows mounted implements utilizing rear wheel lift assist units to interface with a three point hitch of a tractor in a way which prevents damage to the three point hitch.

A variety of systems for connecting implements to a tractor have been developed in which the implement is connected to the tractor by way of a conventional three point hitch. In a three point hitch, the two lower links or arms are driven by the hydraulic system of the tractor to provide operator controlled lifting and lowering movement of the lower links and, likewise, to the associated implement connected to the lower links. The single, upper or stabilizing link of a three point hitch typically is used to maintain a particular horizontal pitch orientation of an implement or to transmit a positive down pressure force to tillage tools mounted on the frame portions of the attached implement.

During the use or transportation of an implement, a number of forces can be developed on the three point hitch, the implement and the implement lift support structure. The three point hitch can provide upward lift by actuating the power lift features of the two lower support arms of the hitch. For example, the upward force is utilized for lifting and carrying an implement during transport from one location to another. During usage of a tillage implement, the two lower lift arms of the hitch and the upper top link operate in concert to orient the implement to ensure proper ground penetration of the tillage tools.

Because of the size and weight of many implements, they cannot, in practice, be totally disengaged from the ground simply by utilizing the upward force of the two bottom links of the three point hitch and an attempt to lift such an implement will result in damaging the tractor hydraulic lift circuit and/or impeding tractor stability. Thus, when using particularly heavy implements, it would be impractical or even impossible to carry the full weight of the implement in cantilever fashion on the three point hitch. Such an attempt, in certain combinations of tractors and implements, would simply act to raise the front wheels of the tractor off of the ground while leaving the implement fully in contact with the ground. In such systems where the three point hitch of the tractor is ineffective for disengaging the implement from the ground, a trailing lift assist support system is typically used to support the main frame of the implement. The lift assist system typically employs one or more ground engaging wheels which are designed to, during lift and transport, contact the ground and carry some of the load of the implement. A power lift means, such as a hydraulic lift cylinder, is normally included for actuation from the hydraulic system of the tractor when it is desired to transfer a portion of the weight of the implement to the ground engaging wheel of the trailing support system. Thus, the cooperation between the wheeled lift assist support system and the three point hitch system acts to provide lifting of the implement. The use of the rear wheel lift assist system is not limited to merely transporting the implement, but is also used when an implement is to be lifted clear of the ground such as for turning at the end of a field and the like.

It is to be appreciated, however, that when the weight of the implement is supported, in part, by the rear wheel trailing support system, the entire system of the tractor and the trailing lift support members acts as a rigid, fixed body with the implement being carried thereby. During transport of the implement in this lifted position, the tractor may be tilted in pitch with respect to the rear lift support system, as the combination of the two pass over uneven terrain. The system must accommodate this difference in pitch between the tractor and the trailing support system in order to avoid damage to the three point hitch upper link due to excessive compression loads between the tractor and the trailing support system.

Various arrangements of linkages have been proposed for providing yieldable interconnections between three point hitches and the trailing frames of implements; however, most such systems are not adapted for tool bar type implements (i.e. where a plurality of relatively independent tool gangs are attached to a transversed tool bar and are vertically movable relatively independent of one another within the range of their operative engagement with the soil). Such tool gangs typically trail the tool bar and have integrated down pressure means on each gang unit. Such gang units typically comprise cultivators, rotary hoes, planters and the like. Application of orientation forces on the tool bar from the tractor remains desirable in many instances to control and selectively increase or decrease the effective down pressure forces across all of the individual gang units. However, there is no integrated frame rearward of the tool bar for transmitting such forces to the units. Therefore, the forces must be applied through the tool bar itself. At such time, stress relief must be provided for the hitch linkages to avoid damage due to excessive compressive loads exerted on the three point hitch by the upper link trailing support system.

Thus, it can be seen in U.S. Pat. No. 4,903,781 that a system is set forth for flexibly mounting agricultural implements. Although the system set forth in the '781 patent does appear to be effective for the above stated purpose, it is generally believed that the mechanism set forth therein to accomplish the flexing between the tractor and the rear lift support system is more complicated, and accordingly, more costly than need be.

Thus, it is an object of this invention, to provide an implement which is capable of isolating the three point hitch of a tractor from excessive compressive loads which would otherwise damage the three point hitch, the tractor or the implement.

SUMMARY OF THE INVENTION

The implement of the present invention generally comprises a frame which is adapted to engage a three point hitch mechanism of a vehicle. The frame is adapted to support a plurality of tool gangs which are attached to the frame, each of the gangs being movable vertically independent of the other gangs. The frame has a longitudinal member extending generally directly away from the vehicle. A first link is pivotally connected to the longitudinal member. A pivot anchor is pivotally connected to at least one of the longitudinal member or the first link. A resilient yielding means is disposed between the longitudinal means and the pivotal anchor member. A hydraulic cylinder is disposed between the pivotal anchor member and the first link for raising and lowering a lift assist wheel. When the first link is acted upon by forces which cause the link to exert a stress on the three point hitch of the vehicle, the resilient yielding means yields way and allows the first link to pivot about the longitudinal member thereby reducing the stress on the three point hitch.

The frame preferably includes a tool bar and the implement preferably includes a second link which is pivotally connected to the longitudinal member.

In its most preferred embodiment, the implement preferably includes a lift assist wheel connected to the first and second links.

Other advantages and meritorious features of the present invention will become more fully understood from the following description of the preferred embodiments, the appended claims and the drawings, a brief description of which follows.

BRIEF DESCRIPTION OF THE DRAWINGS

FIG. 1 is a isometric view of an embodiment of the trailing implement of the present invention.

FIG. 2 is a partial top view of the mounted implement of FIG. 1.

FIG. 3 is a side view of the mounted implement of FIG. 1 showing the rear assist wheel raised off of the ground.

FIG. 4 is an isometric view of the pivotal anchor mechanism of the present invention.

FIG. 5 is a side view of the mounted implement of FIG. 1 showing the rear assist wheel in its ground engaging position.

DETAILED DESCRIPTION OF THE PREFERRED EMBODIMENTS

Now referring to FIG. 1, implement 10 of the present invention is comprised of tool bar 12 which is adapted to engage a standard three point hitch of a tractor (three point hitch not shown in FIG. 1). The upper link of the three point hitch is adapted to engage and be retained in hole 18 of plate 19. The two lower links of the three point hitch are adapted to engage holes in a respectively associated lower plate 21, 23 (see FIG. 2 for lower plates 21, 23). Lower plates 21, 23 transmit draft or towing forces to tool bar 12. Plates 21, 23 are also pivoted (by way of lower links of the three point hitch) in a vertical plane by the hydraulic system of the tractor for positioning purposes and for providing lift and lowering forces in the conventional manner.

Tool gangs 14 are provided at various locations along tool bar 12. Each gang may include a subframe which carries suitable tillage tools, guides or gauge wheels, shields and the like typically by way of parallelogram linkage. Thus, each gang unit floats vertically substantially free of each other unit when in operation. Means such as tension springs in the parallelogram linkage (tension springs not shown) transmit down pressure forces from the tool bar to the subframe of the respective gang. Thus, each gang unit floats vertically substantially free of each other gang unit when in operation while yet still receiving general down forces from the common tool bar 12.

Longitudinally extending members 22, 24 are rigidly fixed, at one end, to tool bar 12. The longitudinally extending members 22, 24 are preferably generally parallel, and extend generally perpendicular away from tool bar 12. Longitudinally extending member 22 is pivotally connected to first and second links 26, 27 and longitudinally extending member 24 is pivotally connected to first and second links 26', 27'. Each link 26, 26', 27, 27' is pivotally connected to rear lift assist wheel assembly 34 whereby links 26, 26', 27, 27' form a parallelogram linkage assembly.

Pivotal anchor mechanism 30 is freely pivotal about axis 36. Axis 36 is preferably the same axis whereby first link 26 and first link 26' pivot about their respectively associated longitudinally extending members 22, 24 respectively. Cushion springs 28 are disposed between longitudinally extending members 22, 24 and first end 38 of pivotal anchor mechanism 30. Lift assist cylinder 32 is disposed between at least one of links 26, 26', 27, 27' and a second end 40 of pivotal anchor mechanism 30. The first and second ends 38, 40 of pivotal anchor mechanism 30 are generally on opposing sides of axis 36. The remaining drawings, will now be used to illustrate how the aforementioned system is operable to prevent damage to the three point hitch of a tractor during transport of the implement.

Now referring to FIGS. 2 and 3, when implement 10 of the present invention is used in its nontransport mode, cylinder 32 is retracted by way of controls from a hydraulic power circuit of the tractor (controls not shown). By retracting lift assist cylinder 32, pivotal anchor mechanism 30 freely pivots about axis 36 until it contacts forward stop 42. After contacting forward stop 42, pivotal anchor mechanism 30 cannot rotate any further about axis 36 and any further contraction of cylinder 32 acts to raise parallel linkage 26, 27 thereby raising rear lift assist wheel assembly 34. The system is preferably designed such that once rear wheel 37 has been raised to a sufficient height, cylinder 32 holds pivotal anchor mechanism 30 firmly against forward stop 42 and thus, as seen in FIG. 3, upon lifting rear wheel 37 from the ground, rear lift assembly 46 does not interfere with the operation of tool gangs 14.

Now referring to FIGS. 4 and 5, when it is desired to manipulate implement 10 from the use position (shown in FIG. 3) into the transport (or non-use or storage) position (shown in FIG. 5), cylinder 32 is extended such that wheel assembly 34 is lowered until it engages the ground. If cylinder 32 is extended past the point where wheel 37 engages the ground (and the hydraulics associated with three point hitch are operated to lift longitudinally extending members 22, 24) then tool gangs 14 will be lifted from engagement with the ground thereby placing them above the ground and in position for transport. As seen in FIG. 5, as hydraulic cylinder 32 is extended, first end 38 of pivotal anchor mechanism 30 is pivoted downward 48 thereby compressing cushion springs 28. As long as second end 40 of pivotal anchor mechanism 30 is not in contact with rearward stop 43, springs 28 by virtue of being linked to pivotal anchor mechanism 30 are effective for cushioning or yielding to any pivotal motion between links 26, 26', 27, 27' and longitudinally extending members 22, 24. Thus it can be easily seen that if a tractor is transporting tool gangs 14 in the manner depicted of FIG. 5 and suddenly a ground contour is encountered whereby an increased upward force is exerted against rear wheel 37, cushion springs 28 will be compressed and effectively absorb any pivotal motion of links 26, 26', 27, 27' until second end 40 of pivotal anchor mechanism 30 contacts rearward stop 43. In a preferred embodiment, conventional adjustment mechanisms are used to adjust the force exerted upon anchor 30 by cushion springs 30.

Now referring to FIG. 4, pivotal anchor mechanism 30 is constructed of a rigid body comprising two first end portions 38 and second end portion 40. First end portions 38 are adapted to engage cushion springs 28 via notches 52 and second end 40 is adapted to engage one end of lift assist cylinder 32. First end and second end 38, 40 of pivotal anchor mechanism 30 are fixed to central pivoting cylinder 54. Central pivoting cylinder 54 is fitted with central aperture 56 which passes therethrough thereby enabling cylinder 54 to freely pivot about axis 36. The only factor which limits the extent to which cylinder 54 can pivot about axis 36 is the engagement between pivotal anchor mechanism 30 and forward and rearward stop 42, 43 respectively.

As can be seen from FIG. 5, in the transport position, with the gangs 14 raised and the assist wheel engaging the ground, pivotal anchor 30 is left free to rotate about axis 36 thereby compressing cushion springs 28 upon the event that wheel 37 encounters uneven ground conditions. There is an additional advantage of the present invention in that any vibration or small bumps encountered by wheel 37 is, likewise, reflected onto cushion springs 28 which accordingly absorbs such vibrations and cushion the reflected load on the tractor thereby allowing for a smoother ride.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. Accordingly, it is to be understood that the subject matter sought to be afforded protection hereby, should be deemed to extend to the subject matter defined in the appended claims, including all fair equivalents thereof.

We claim:

1. An implement, comprising:
    a frame adapted to engage a three point hitch mechanism of a vehicle, said frame further adapted to support a plurality of tool gangs attached to said frame, each of said gangs being movable vertically independent of the other of said gangs, said frame having a longitudinal member extending generally directly from said vehicle,
    a first link pivotally connected to said longitudinal member and having a lift assist wheel attached thereto,
    a pivotal anchor mechanism pivotally connected to at least one of said longitudinal member and said first link,
    resilient yielding means disposed between said longitudinal member and said pivotal anchor mechanism,
    extendable/retractable cylinder means connected to said pivotal anchor mechanism for vertically positioning said first link and lift assist wheel relative to said longitudinal member,
    whereby, when said first link is acted upon by vertical forces resulting from vertical displacement of said wheel and which normally cause said first link to exert stresses on said three point hitch of said vehicle, said resilient yielding means yields thus allowing pivotal movement of said first link relative to said longitudinal member and absorbs said forces thereby reducing the stress on said three point hitch.

2. The implement of claim 1, wherein said frame is comprised of a tool bar.

3. The implement of claim 1, further including a second link pivotally connected to said longitudinal member, and with said lift assist wheel being connected to said first and second links.

4. The implement of claim 3, wherein said cylinder means includes a hydraulic cylinder.

5. The implement according to claim 1 further including means for limiting movement of said pivotal anchor mechanism in a first direction relative to said longitudinal member.

6. The implement according to claim 5 further including means for limiting movement of said pivotal anchor mechanism in a second direction relative to said longitudinal member.

7. An agricultural implement adapted to be pulled over a field and behind a tractor, said implement comprising:
    a transversely extending frame member adapted to engage each point of a three point hitch on said tractor,
    a plurality of tool gangs attached to said transversely extending frame member,
    a longitudinally extending frame member having first and second ends, said first end rigidly fixed to said transversely extending frame member, said longitudinally extending frame member extending generally perpendicular from said transversely extending frame member,
    a first link pivotally connected to said second end of said longitudinally extending frame member and having a lift assist wheel carried thereby,
    a pivotal anchor pivotally connected to at least one of said longitudinally extending frame member and said first link,
    extendable/retractable cylinder means connected to said pivotal anchor for vertically positioning said first link relative to said longitudinally extending frame member thus controlling the position of said wheel and thereby influencing the vertical position of said gangs relative to said field, and
    resilient means operably connected to said pivotal anchor and to said longitudinally extending frame member, said resilient means permitting substantial pivotal movement of said first link in response to vertical displacement of the wheel and relative to said longitudinally extending frame member prior to displacement of said transversely extending frame member thereby effectively isolating said three point hitch of said tractor from forces exerted onto said implement by way of said first link.

8. The agricultural implement according to claim 7 further including a first limit stop carried by at least one of said longitudinally extending frame member and said first link for engaging with said pivotal anchor upon retraction of said cylinder means.

9. The agricultural implement according to claim 8 further including a second limit stop carried by at least one of said longitudinally extending frame member and said first link for engaging with said pivotal anchor upon extension of said cylinder means.

* * * * *